(12) United States Patent
Paik et al.

(10) Patent No.: US 12,525,061 B2
(45) Date of Patent: Jan. 13, 2026

(54) BEHAVIOR RECOGNITION METHOD AND DEVICE USING DEEP LEARNING

(71) Applicant: CHUNG ANG UNIVERSITY INDUSTRY ACADEMIC COOPERATION FOUNDATION, Seoul (KR)

(72) Inventors: Joon Ki Paik, Seoul (KR); Ha Sil Park, Seoul (KR); Joong Chol Shin, Seoul (KR); Jin Sol Ha, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/639,695

(22) Filed: Apr. 18, 2024

(65) Prior Publication Data

US 2025/0046121 A1 Feb. 6, 2025

Related U.S. Application Data

(63) Continuation of application No. PCT/KR2021/017921, filed on Nov. 30, 2021.

(30) Foreign Application Priority Data

Oct. 20, 2021 (KR) .......................... 10-2021-0140340

(51) Int. Cl.
*G06V 40/20* (2022.01)
*G06V 10/764* (2022.01)
(Continued)

(52) U.S. Cl.
CPC ............ *G06V 40/20* (2022.01); *G06V 10/764* (2022.01); *G06V 10/7715* (2022.01); *G06V 10/806* (2022.01); *G06V 10/82* (2022.01)

(58) Field of Classification Search
CPC .. G06V 40/20; G06V 10/764; G06V 10/7715; G06V 10/806; G06V 10/82;
(Continued)

(56) References Cited

FOREIGN PATENT DOCUMENTS

KR 10-2020-0036093 A 4/2020
KR 10-2020-0068545 A 6/2020
(Continued)

OTHER PUBLICATIONS

Jinsol Ha, Action Recognition method using Deep Feature map and Bidirectional Exponentional Moving average Neural network, DBpia, Conference of the Institute of Electronics and Information Engineers, 2020, 8, pp. 2613-2615 (Aug. 2020). (Year: 2020).*
(Continued)

*Primary Examiner* — Ross Varndell

(57) ABSTRACT

A method using deep learning includes: sampling video to generate a video clip composed sampled frames, and generating a set of differential images between the sampled frames; extracting a first feature map with spatial features and a second feature map with temporal features by applying the sampled frames and the set of differential images to a learned deep learning-based behavior recognition model, and generating a spatio-temporal combined feature map for each sampled frame by combining the first feature map and the second feature map; calculating a bi-directional exponential moving average using the spatio-temporal combined feature map, and then adjusting weights of the spatio-temporal combined feature maps; generating a temporal relationship importance map by applying the video clip and performing late fusion by applying the weight-adjusted spatio-temporal combined feature map and the temporal relationship importance map to the learned deep learning-based behavior recognition model, and classifying the behavior.

8 Claims, 9 Drawing Sheets

(51) Int. Cl.
*G06V 10/77* (2022.01)
*G06V 10/80* (2022.01)
*G06V 10/82* (2022.01)

(58) Field of Classification Search
CPC ...... G06V 10/40; G06V 10/454; G06V 20/41; G06V 20/40; G06F 18/00; G06F 18/253; G06N 3/08; G06N 3/0464
See application file for complete search history.

(56) References Cited

FOREIGN PATENT DOCUMENTS

| KR | 10-2020-0092509 A | 8/2020 |
|---|---|---|
| KR | 10-2021-0090238 A | 7/2021 |

OTHER PUBLICATIONS

Tran, Du, et al. "Learning spatiotemporal features with 3d convolutional networks." Proceedings of the IEEE international conference on computer vision. 2015. (Year: 2015).*

International Search Report of PCT/KR2021/017921 dated Jul. 5, 2022.

Written Opinion of the International Searching Authority of PCT/KR2021/017921 dated Jul. 5, 2022.

Du Tran, Learning Spatiotemporal Features with 3D Convolutional Networks, arXiv:1412.0767v4 [cs.CV] Oct. 7, 2015.

Jinsol Ha, Action Recognition method using Deep Feature map and Bidirectional Exponentional Moving average Neural network, DBpia.

Notice To Submit a Response from Korean Intellectual Property Office dated Apr. 24, 2023 for KR Patent Application No. 10-2021-0140340.

Notice To Submit a Response from Korean Intellectual Property Office dated Nov. 20, 2023 for KR Patent Application No. 10-2021-0140340.

Notice of Decision To Grant a Patent from Korean Intellectual Property Office dated Nov. 24, 2024 for KR Patent Application No. 10-2021-0140340.

Jinsol Ha, Action Recognition method using Deep Feature map and Bidirectional Exponentional Moving average Neural network, DBpia, Conference of the Institute of Electronics and Information Engineers, 2020, 8, pp. 2613-2615 (Aug. 2020).

* cited by examiner

FIG. 5

| Model | Accuracy(%) | |
|---|---|---|
| | UCF101 | KTH Dataset |
| RGB | 48.40 | 65.28 |
| RGB+Diff | 54.62 | 72.69 |
| RGB+Diff+Moving avg. | 55.97 | 73.10 |
| RGB+Diff+Moving avg. +C3D | 72.03 | 73.61 |

FIG. 6

| Moving Average Parameter: α | Accuracy(%) |
|---|---|
| 0.5 | 53.89 |
| 0.6 | 54.50 |
| 0.7 | 55.19 |
| 0.8 | 55.43 |
| 0.9 | 55.97 |

FIG. 7

| Model | Accuracy(%) |
|---|---|
| 2DCNN [5] | 48.40 |
| Ishan et al. [15] | 50.90 |
| C3D [10] | 70.02 |
| Proposed method | 72.03 |

FIG. 8

| Model | Accuracy(%) |
|---|---|
| 2DCNN [5] | 62.28 |
| C3D [10] | 66.20 |
| Proposed method | 73.61 |

BEHAVIOR RECOGNITION METHOD AND DEVICE USING DEEP LEARNING

CROSS-REFERENCE TO RELATED APPLICATION

This application is a continuation of pending PCT International Application No. PCT/KR2021/017921, which was filed on Nov. 30, 2021, and which claims priority to Korean Patent Application No. 10-2021-0140340 which was filed in the Korean Intellectual Property Office on Oct. 20, 2021. The disclosures of which are hereby incorporated by reference in their entireties.

TECHNICAL FIELD

The present disclosure relates to a behavior recognition method using deep learning, and device thereof.

BACKGROUND ART

Behavior recognition is undergoing extensive research to be utilized in various fields such as real-time intelligent surveillance systems, human-computer interaction, and autonomous driving systems. Therefore, it can be considered a crucial task in the video domain, and real-time processing for responding to behavior recognition is indispensable.

Behavior recognition is a research field that involves detecting motion in video sequences and classifying them into corresponding behavior classes. Behaviors in video sequences may occur continuously or intermittently throughout the entire frame sequence. Therefore, videos are often treated as sequences of frames composed of images.

Many methods utilizing deep learning have been researched for efficient behavior recognition. In particular, as behavior recognition can be seen as an extension of image classification tasks, numerous approaches using Convolutional Neural Network (CNN) feature maps have been proposed. Traditional 2D convolutional neural networks using 2D convolution feature maps can effectively recognize features of objects.

AlexNet, which initially demonstrated significant performance in 2D Convolutional Neural Networks (CNNs), consists of 8 layers including convolutional layers, max-pooling layers, dropout layers, and fully connected layers. Subsequently, models were researched with deeper layer structures to enhance classification performance. VGG16-net, for instance, has an architecture with 16 layers comprising convolutional layers, pooling layers, and fully connected layers while maintaining a 3×3 filter size. Similarly, various structures of 2D Convolutional Neural Networks such as GoogLeNet and DenseNet have been studied for high-performance feature classification.

However, the limitation of 2D CNNs lies in their focus on spatial features only, which restricts their ability to reflect temporal features structurally.

DISCLOSURE

Technical Problem

An object of the present disclosure is to provide behavior recognition method using deep learning, and device thereof.

Another object of the present disclosure is to provide fast and accurate action recognition through a deep learning model capable of applying spatio-temporal information to input images.

Yet another object of the present disclosure is to increase the importance of temporal correlation by fusing a 2D deep learning model and a 3D deep learning model, and to increase the accuracy of action recognition by assigning a high weight to important action sections.

Technical Solution

According to an aspect of the present disclosure, there is provided a method for behavior recognition using deep learning.

According to an embodiment of the present disclosure, A behavior recognition method using deep learning, comprising: (a) sampling video to generating a video clip composed sampled frames, and generating a set of differential images between the sampled frames; (b) extracting a first feature map with spatial features and a second feature map with temporal features by applying the sampled frames and the set of differential images to a learned deep learning-based behavior recognition model, and generating a spatio-temporal combined feature map for each sampled frame by combining the first feature map and the second feature map; (c) calculating a bi-directional exponential moving average using the spatio-temporal combined feature map, and then adjusting weights of the spatio-temporal combined feature maps of the sampled frames; (d) generating a temporal relationship importance map by applying the video clip to the learned deep learning-based behavior recognition model; and (e) performing late fusion by applying the weight-adjusted spatio-temporal combined feature map and the temporal relationship importance map to the learned deep learning-based behavior recognition model, and classifying the behavior.

The bi-directional exponential moving average adjusts weights symmetrically based on the spatio-temporal combined feature map when frame order for the sampled frames is $$\frac{N-1}{2}.$$

The bi-directional exponential moving average is calculated as follows:

$$S_n = \begin{cases} \alpha S_{n+1} + (1-\alpha)V_n, & t < \frac{N-1}{2} \\ V_n, & t = \frac{N-1}{2} \\ \alpha S_{n-1} + (1-\alpha)V_n, & t > \frac{N-1}{2} \end{cases}$$

wherein $V_n$ represents a feature vector of the spatio-temporal combined feature map for sampled frame, n represents an index with the temporal order of the sampled frame, $\alpha$ is a constant value between 0 and 1, indicating the ratio adjustment of the bi-directional exponential moving average.

The deep learning-based behavior recognition model comprises plurality of 2D CNN models and 3D CNN model, wherein the first feature map and the second feature map are generated by the plurality of 2D CNN models, the temporal relationship importance map is generated by the 3D CNN model.

The step (e) may include: fusing a soft-max value of an activation function of the weight-adjusted spatio-temporal combined feature map and a soft-max value of an activation function of the temporal relationship importance map, and classifying the behavior using the fused result.

According to another aspect of the present invention, A behavior recognition device using deep learning is provided.

According to another embodiment of the present invention, A behavior recognition device using deep learning may include: preprocessing unit samples video to generating a video clip composed sampled frames, and generates a set of differential images between the sampled frames; behavior classification unit extracts a first feature map with spatial features and a second feature map with temporal features by applying the sampled frames and the set of differential images to a learned deep learning-based behavior recognition model, and generates a spatio-temporal combined feature map for each sampled frame by combining the first feature map and the second feature map; and behavior classification unit generates a spatio-temporal combined feature map with spatial features and temporal features by applying the sampled frames and the set of differential images to a learned deep learning-based behavior recognition model, adjust weight of the spatio-temporal combined feature map by calculating a bi-directional exponential moving average, fuses the weight-adjusted spatio-temporal combined feature map and a temporal relationship importance map having 3D features of the sampled frames, and then classifies the behavior.

The deep learning-based behavior recognition model may include: feature extraction unit generates the first feature map with spatial features by the sampled frames to a first 2D CNN model, generates the second feature map with temporal features by applying the sampled frames to a second 2D CNN model, and generates the spatio-temporal combined feature map for each sampled frame by combining the first feature map and the second feature map; 3D CNN model unit generates the temporal relationship importance map by applying the video clip to the learned deep learning-based behavior recognition model; weight adjustment unit calculates the bi-directional exponential moving average using the spatio-temporal combined feature map, and then adjusts weights of the spatio-temporal combined feature maps of the sampled frames; and fusion classification unit performs late fusion by applying the weight-adjusted spatio-temporal combined feature map and the temporal relationship importance map to the learned deep learning-based behavior recognition model, and classifies the behavior.

The feature extractor and the 3D CNN model unit are connected by a plurality of fully connected layers (FC layers), the weight adjustment unit is disposed behind the plurality of fully connected layers (FC layers), and adjust the weight of the sampled spatio-temporal combined feature map by connecting to the plurality of fully connected layers (FC layers).

The bi-directional exponential moving average adjusts weights symmetrically based on the spatio-temporal combined feature map when frame order for the sampled frames is $$\frac{N-1}{2}.$$

The fusion classification unit fuses a soft-max value of an activation function of the weight-adjusted spatio-temporal combined feature map and the temporal relationship importance map with equal weights, and classifying the behavior using the fused result.

A training unit that trains the deep learning-based behavior recognition model using a training data set.

Advantageous Effects

According to an exemplary embodiment of the present disclosure, there is an advantage of more efficiently using context information by providing the multiple object detection method and apparatus to combine only adjacent features.

According to an exemplary embodiment of the present disclosure, there is an advantage in enabling fast and accurate behavior recognition through a deep learning model capable of applying spatio-temporal information to input image by providing the behavior recognition method using deep learning, and device thereof.

Further, there is an advantage that the present disclosure increases the importance of temporal correlation by fusing a 2D deep learning model and a 3D deep learning model, and increases the accuracy of action recognition by assigning a high weight to important action sections.

BRIEF DESCRIPTION OF THE DRAWINGS

FIG. 5 is a diagram illustrating behavior recognition results according to conventional methods and an embodiment of the present disclosure.

FIG. 6 is a diagram illustrating results of a changes for weight adjustment according to an embodiment of the present disclosure.

FIG. 7 and FIG. 8 are Diagrams comparing the accuracy of behavior recognition according to conventional methods and an embodiment of the present disclosure.

BEST MODE

Singular forms used in the present specification may include plural forms unless the context clearly indicates otherwise. In the specification, a term such as "composed of" or "include," and the like, should not be construed as necessarily including all of several components or several steps described in the specification, and it should be construed that some component or some steps among them may not be included or additional components or steps may be further included. In addition, the terms " . . . unit', "module", and the like disclosed in the specification refer to a processing unit of at least one function or operation and this may be implemented by hardware or software or a combination of hardware and software.

Hereinafter, embodiments of the present disclosure will be described in detail with reference to the accompanying drawings.

Figure 1:
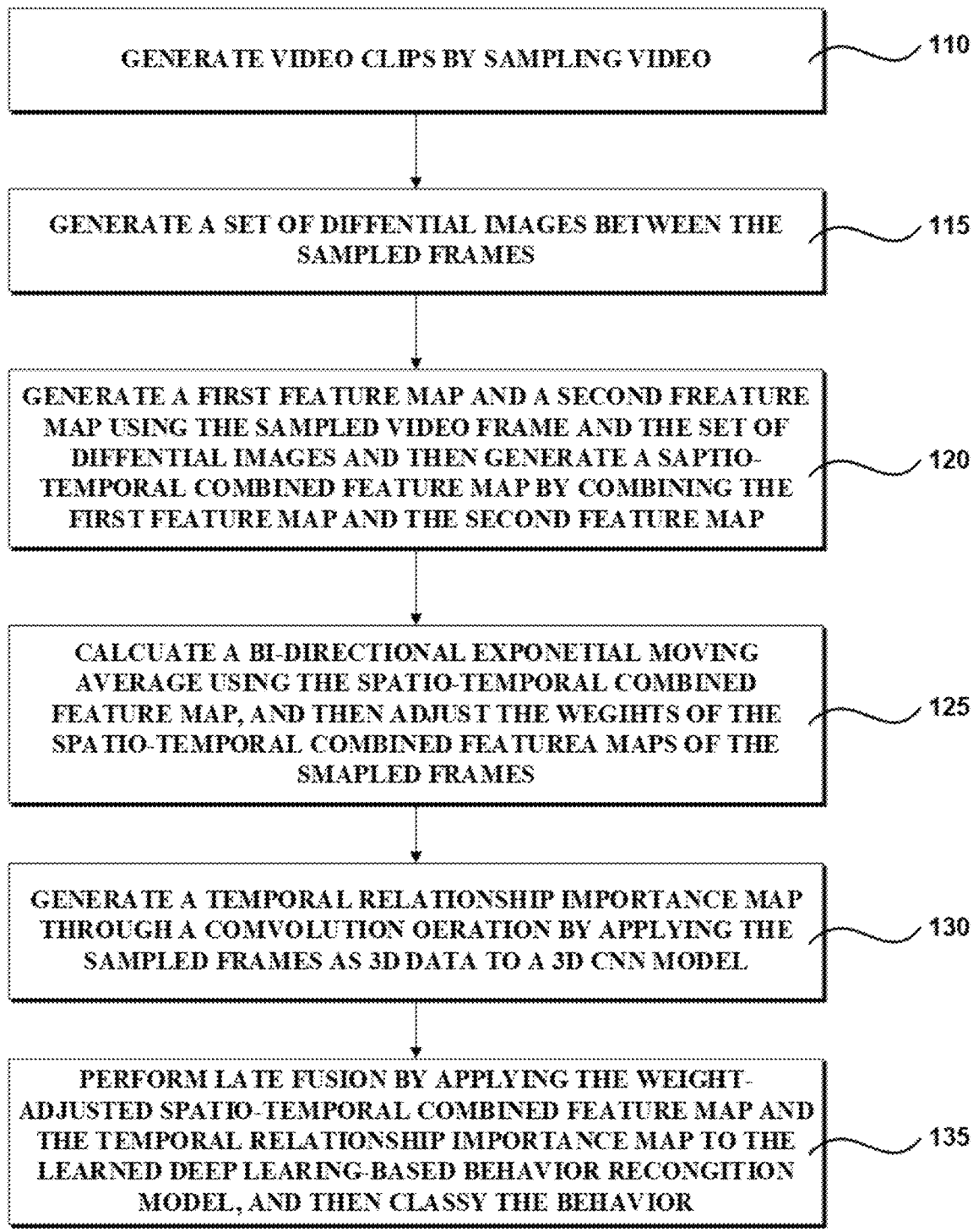
FIG. 1 is a sequential diagram illustrating a method for behavior recognition using deep learning according to an embodiment of the present disclosure.
Figure 2:
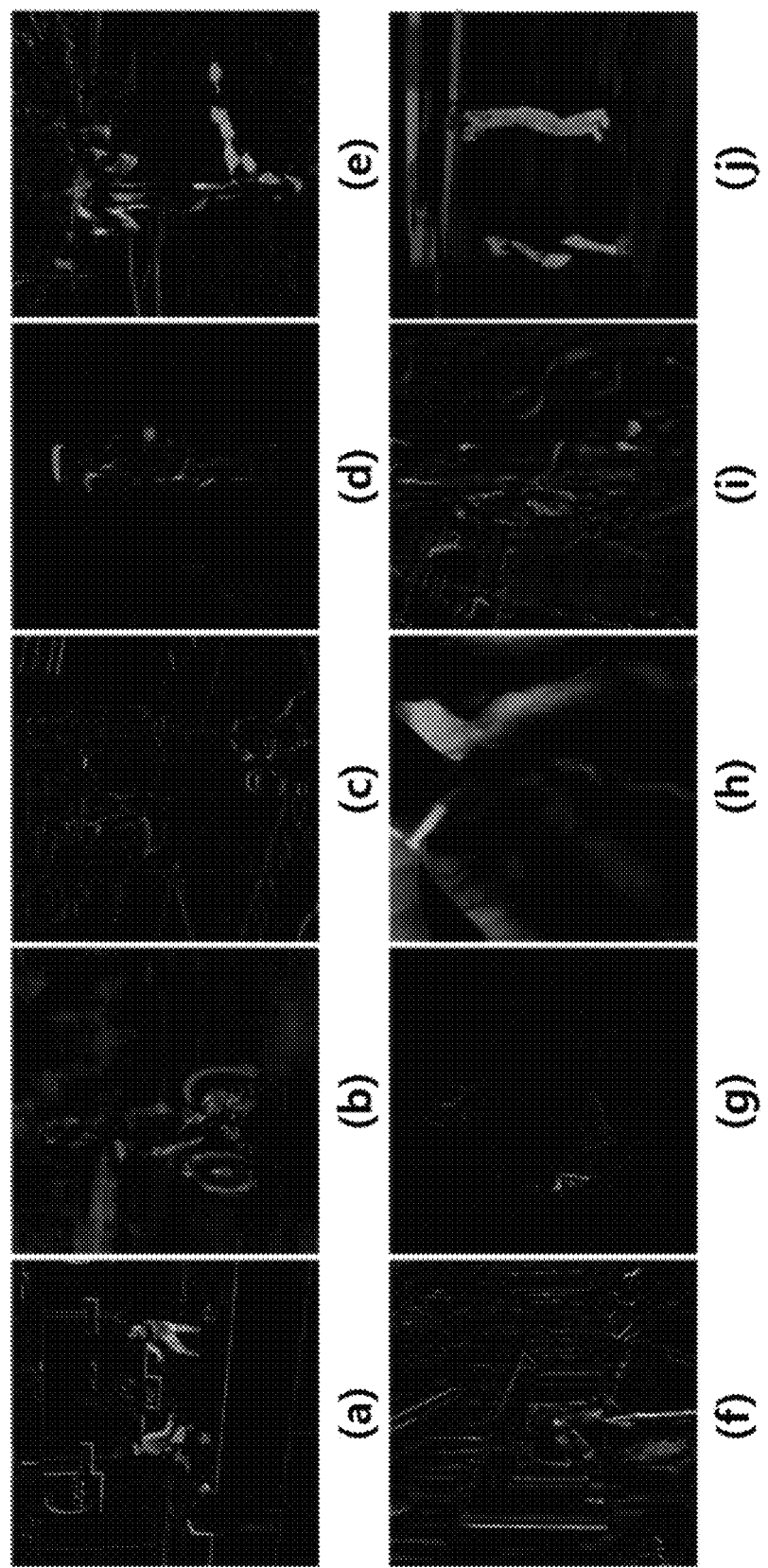
FIG. 2 is a diagram illustrating an example of a motion image set according to an embodiment of the present disclosure.
Figure 3:
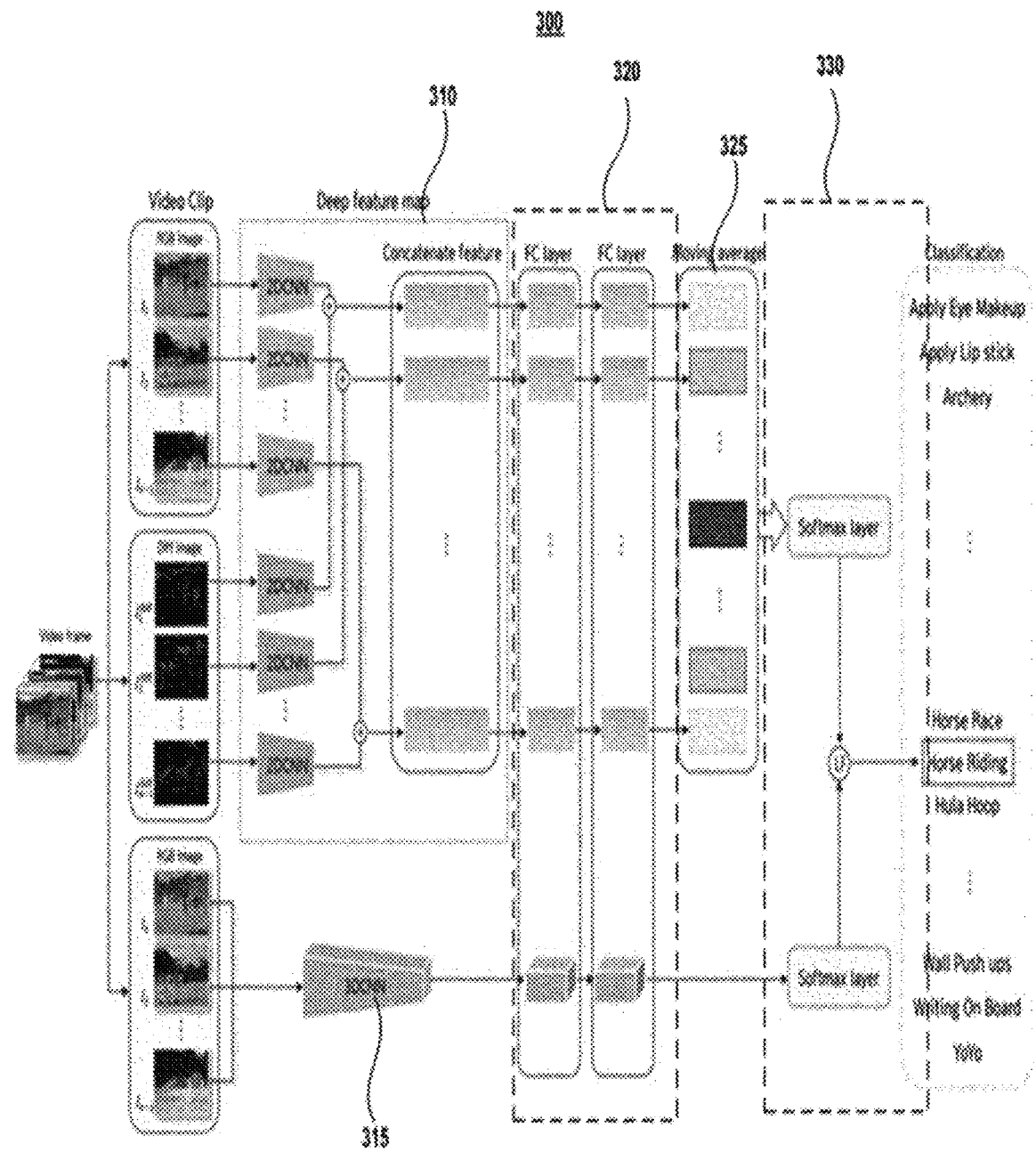
FIG. 3 is a diagram illustrating the configuration of a deep learning-based behavior recognition model according to an embodiment of the present disclosure.
Figure 4:
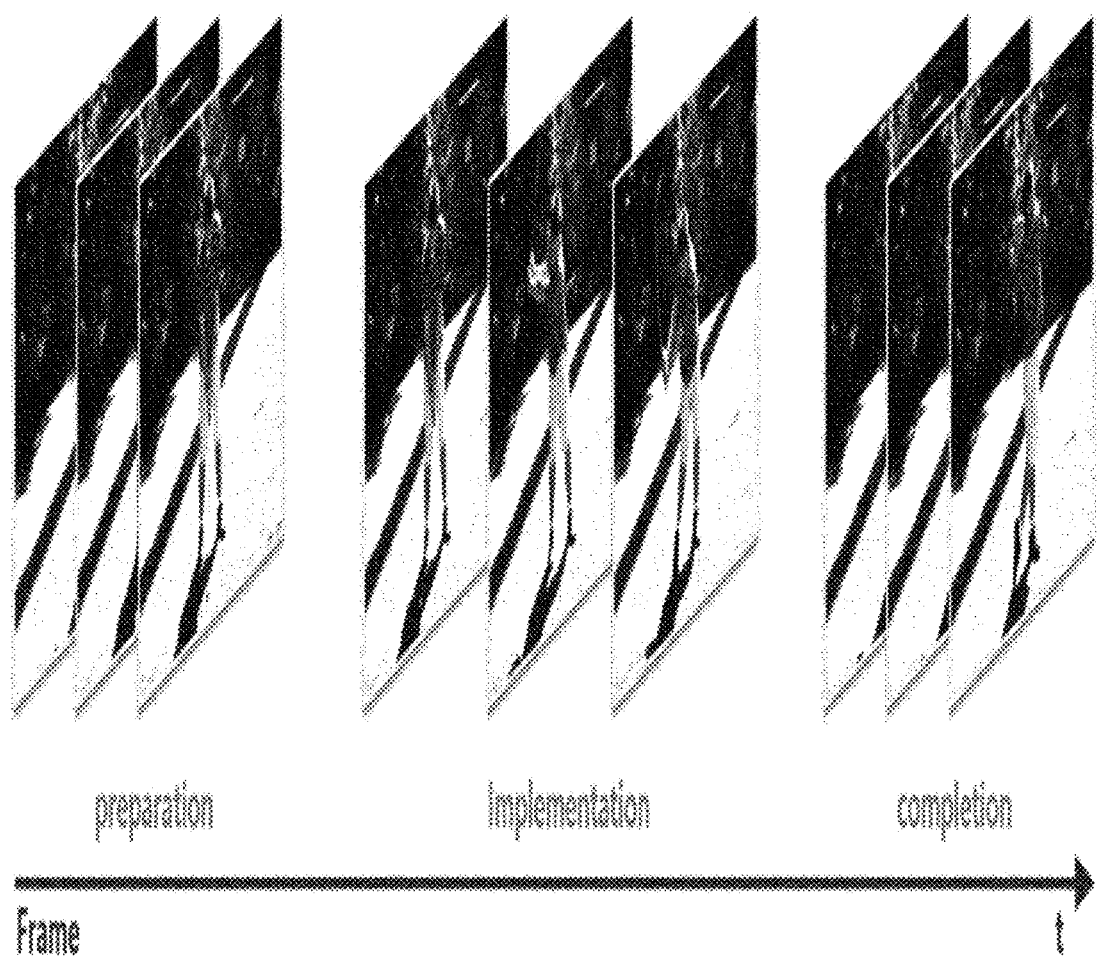
FIG. 4 is a diagram illustrating weight adjustment according to an embodiment of the present disclosure.

FIG. 1 is a sequential diagram illustrating a method for behavior recognition using deep learning according to an embodiment of the present disclosure, FIG. 2 is a diagram illustrating an example of a motion image set according to an embodiment of the present disclosure, FIG. 3 is a diagram illustrating the configuration of a deep learning-based behavior recognition model according to an embodiment of the present disclosure, FIG. 4 is a diagram illustrating weight adjustment according to an embodiment of the present disclosure, FIG. 5 is a diagram illustrating behavior recognition results according to conventional methods and an embodiment of the present disclosure, FIG. 6 is a diagram illustrating results of changes for weight adjustment according to an embodiment of the present disclosure, and FIG. 7 and FIG. 8 are Diagrams comparing the accuracy of behavior recognition according to conventional methods and an embodiment of the present disclosure.

In step 110, the deep learning-based behavior recognition device 100 samples video frames and then generates video clip. For example, if a single action continues for ten seconds, 300 frames are generated assuming the frame rate 30 frame per second.

Utilizing all frames in the video for behavior recognition has the problem of being difficult to implement in practice due to the enormous amount of computation.

Therefore, in an embodiment of the present disclosure, frames of video are sampled to make shorter video clips, thereby reducing computational complexity.

This will be explained in more detail.

When referring to the initial video frames as $\{I^*_0, \ldots, I^*_{T-1}\}$, the sampled video frames are as follows: $\{I_0, \ldots, I_{N-1}\}$.

The video frame sampling method can be expressed as Equation 1.

$$I_n = \begin{cases} I^*_{mn}, & n = 0, \ldots, N-2 \\ I^*_{T-1}, & n = N-1 \end{cases} \quad \text{[Equation 1]}$$

The sampled video frames have a uniform interval and provide ordered continuity between frames. In an embodiment of the present disclosure, N=16 is set and each frame is resized to 112×112 for best performance and computational efficiency.

In step 115, the deep learning-based behavior recognition device 100 generates a set of difference images for the sampled video frames.

The RGB space of the sampled video frames contains spatial information, while each sequence of frames contains temporal information. In an embodiment of the present disclosure, difference images can be generated using the sampled video frames.

Difference images are created by calculating the pixel-wise difference between adjacent frames. Mathematically, this can be represented as shown in equation 2.

$$I_n^{diff}(x, y) = I_n(x, y) - I_{n-1}(x, y), \text{ for } n = 1, \ldots, N-1 \quad \text{[Equation 2]}$$

Where $I_n$ represents n-th sampled video frame, x and y represent the position of each pixel within the frame, and n represents a temporal parameter for each frame.

FIG. 2 shows the results of the difference images for a portion of the UCF101 dataset.

It can be seen that by utilizing the difference between adjacent video frames, a differential image is generated, where the background and objects are removed, leaving only the motion.

In case (g) of FIG. 2, this is a video of a person mixing using their hands. When a differential image is generated from a video captured by a stationary camera, it can be seen that only the feature information of the upper body of the person, who has strong motion, and the hand mixing remain.

In case (a) and (f) of FIG. 2, where the camera is not stationary, some background regions remain due to the movement of the camera, but the pixel values of a person with major movements remain strong.

In step 120, the deep learning-based behavior recognition device 100 generates the first and second feature maps using the sampled video frames and the set of difference images, and then combines them to generate a spatio-temporal fused feature map.

For convenience of understanding and description, referring to FIG. 3, the deep learning-based behavior recognition model will first be described.

Referring to FIG. 3, the deep learning-based behavior recognition model 300, according to an embodiment of the present disclosure, comprises a feature extraction unit 310, a 3D CNN model unit 315, two fully connected layers 320, a weight adjustment unit 325, and a fusion classification unit 330.

The feature extraction unit 310 consists of a plurality of 2D CNN models, as depicted in FIG. 3.

For convenience of understanding and description, let's refer to them as a first 2D CNN model and a second 2D CNN model. It should be noted that each of the first and second 2D CNN model may also consist of multiple units.

The first 2D CNN model generates a first feature map with spatial features through convolutional operations applied to the sampled video frames. Since the structure of a 2D CNN and the method of generating feature maps through convolution operations are well-known, a detailed explanation on this matter is omitted.

The sampled video frames consist of RGB based images, and the first feature map containing spatial information (features) about objects may be generated through convolution operations using the first 2D CNN model.

Where the first feature map may be generated using Equation 3:

$$F_{RGB} = \phi(I_n(x, y)) \quad \text{[Equation 3]}$$

Wherein represents the bottleneck feature map of the backbone VGG16 network.

The sampled video frames consist of RGB based frames, where the RGB space contains spatial information, and each frame sequence contains temporal information.

The second 2D CNN model serves as a means for generating the second feature map with temporal features (information) through convolution operations, after receiving a set of difference images.

This can be represented mathematically as shown in equation 4.

$$F_{diff} = \phi(I_n^{diff}(x, y)) \quad \text{[Equation 4]}$$

The second feature map may be a bottleneck feature map returned by the backbone VGG16 network in the same way as the first feature map generation.

When learning actions from a video, it is important to train the spatio-temporal information of the action. Therefore, in an embodiment of the present disclosure, the deep learning-based behavior recognition model 300 generates a spatio-temporal combined feature map by concatenating the first feature map containing spatial information with the second feature map containing temporal information.

Referring to FIG. 3, it is assumed that a first sampled video frame, a second sampled video frame, and corresponding first and second difference images exist when generating the spatio-temporal combined feature map.

The first sampled video frame and the second sampled video frame can each be fed into a 2D CNN model to generate RGB based feature map, denoted as 1a and 1b feature map. Similarly, the first and second difference images can be input to a 2D CNN model to generate 2a and 2b feature maps. Then the spatio-temporal combined feature map may be generated by combining the corresponding feature maps from the same video frames.

For example, 1a feature map, generated based on the first sampled video frame, and 2a feature map, generated based on the first difference image (which is a difference image of the first sampled video frame), can be combined together to generate a first spatio-temporal combined feature map. Similarly, 1b feature map, generated based on the second sampled video frame, and 2b feature map, generated based on the second difference image (which is a difference image of the second sampled video frame), can be combined to generate a second spatio-temporal combined feature map.

Each spatio-temporal combined feature map generated in this way can be passed to first and second fully connected layers 320 connected after the feature extraction unit 310, where the feature vector $V_{n'}$ can be computed.

This can be represented mathematically as shown in equation 5.

$$V_n = FC_n(\psi(F_{RGB} \circ F_{diff})) \quad \text{[Equation 5]}$$

Wherein $\psi(\circ)$ represents a feature map concatenation operator, $FC_{n'}$ represents the fully-connected layer for the n-th feature map.

3D CNN model unit 315 is a means for generating a temporal relationship importance map through convolutional operations after receiving the sampled frames as 3D data inputs.

The weight adjustment unit 325, as will be explained in more detail below, is a means to compute bidirectional exponential moving average values from the spatio-temporal combined feature maps of sampled frames and adjust weights based on the bi-directional exponential moving average values.

The fusion classification unit 330 is a means for fusion of the weight-adjusted spatio-temporal combined feature map and the temporal relationship importance map and then classifying behavior based on the fused result.

In step 125, the deep learning-based behavior recognition device 100 computes the bidirectional exponential moving average using the spatio-temporal combined feature maps of the sampled frames and adjusts the weights based on the bidirectional exponential moving average values.

This will be explained in more detail.

The bi-directional exponential moving average is utilized to assign a higher weight to important frame of behavior within sampled frames.

This will be explained in more detail.

The bi-directional exponential moving average is utilized to give more weight to important sections of behavior within sampled frames.

FIG. 4 is a diagram illustrating the action process, showing that when the frames are arranged sequentially, the action proceeds through the preparation process, implementation process, completion process in the same order. Therefore, there are segments in the action sequences that require focused attention, need to be focused on.

In an embodiment of the present disclosure, it is assumed that the most important information is contained within the middle frame segment (implementation process) of the video during the learning phase, where the action is performed.

Therefore, in an embodiment of the present disclosure, the bi-directional exponential moving averages, wherein the weights decrease from the middle frame towards the extremes, are applied to video clips, thereby assigning a higher weight of the image information of the middle frames. The bi-directional exponential moving averages can undergo a recursive computation process based on weights of the feature map (i.e., the spatio-temporal combined feature map) for the middle frame among the sampled frames. The bi-directional exponential moving average can be computed using Equation 6.

$$S_n = \begin{cases} \alpha S_{n+1} + (1-\alpha)V_n, & t < \dfrac{N-1}{2} \\ V_n, & t = \dfrac{N-1}{2} \\ \alpha S_{n-1} + (1-\alpha)V_n, & t > \dfrac{N-1}{2} \end{cases} \quad \text{[Equation 6]}$$

Wherein $V_{n'}$ represents a feature vector for the spatio-temporal combined feature map for the sampled frame, and a is a constant value between 0 and 1, indicating the ratio adjustment of the bi-directional exponential moving average.

FIG. 6 shows the results of an experiment while changing α. As shown in FIG. 6, it can be observed that as α closes in on 1, the accuracy of behavior recognition accuracy increases. Therefore, in an embodiment of the present disclosure, α is experimentally set to 0.9.

The final loss is computed as shown in Equation 7 for classification using the recursively computed bidirectional exponential moving average from Equation 6.

$$S = \dfrac{S_0 + S_{N-1}}{2} \quad \text{[Equation 7]}$$

Wherein $S_0$ and $S_{N-1}$ represents values at each end assigned the weight based on the center frame (middle frame) among sampled frames and are ultimately in the form of a fully connected layer.

In step 130, the deep learning-based behavior recognition device 100 generates a temporal relationship importance map through convolutional operations by applying the sampled frames as 3D data to a 3D CNN model.

For example, sampled frames with a size of 3×16×112×112 can be inputted to a 3D CNN model to generate a temporal relationship importance map.

In step 135, the deep learning-based behavior recognition device 100 performs late fusion by applying the weight-adjusted spatio-temporal combined feature map to the learned deep learning-based behavior recognition model and then classifies the behavior.

This will be explained in more detail.

As shown in FIG. 3, a first softmax value, which is an activation function, can be derived from the weight-adjusted spatio-temporal combined feature map. Additionally, a second softmax value, which is an activation function, can be derived from the temporal relationship importance map.

This can be represented mathematically as shown in equation 8 and equation 9.

$$\hat{S} = F_{softmax}(S) \quad \text{[Equation 8]}$$

$$\hat{S}_{C3D} = F_{softmax}(S_{C3D}) \quad \text{[Equation 9]}$$

Wherein $S_{C3D}$ represents the last connected-layer of the 3D CNN model.

In this way, If the result of applying softmax is fused with the same weight, it can be expressed as Equation 10.

$$LF = \frac{1}{2}(\hat{S} + \hat{S}_{C3D}) \quad \text{[Equation 10]}$$

According to an embodiment of the present disclosure, the results of applying soft-max to both the weight-adjusted spatio-temporal combined feature map and the temporal relationship importance map are fused with the same weights, and then may be classified the behavior using the fused results.

This can be represented mathematically as shown in equation 11.

$$c = \sum (\text{label} - LF)^2 \quad \text{[Equation 11]}$$

Therefore, equation 11 described above represents the objective function for behavior recognition in the sampled video clips (frames). As a result, the objective function operates on each behavior classification label through least squares, as depicted in Equation 11. Behavior can be classified based on the label with the minimum loss value.

FIG. 5 is a table comparing behavior classification accuracy results between the prior art and an embodiment of the present disclosure.

RGB+Diff' indicates the accuracy achieved by incorporating both the RGB image and the difference image in the backbone. 'RGB+Diff+Moving avg' illustrates the accuracy results obtained by applying bidirectional moving averages to the results derived from both RGB and difference images. Finally, 'RGB+Diff+Moving avg.+C3D' denotes the accuracy result in accordance with an embodiment of the present disclosure."

In FIG. 5, "RGB" represents a backbone utilizing VGG16-net and the resulting accuracy when using only the RGB image of the input video clip. "RGB+Diff" represents the result of using the RGB image and the difference image in backbone. "RGB+Diff+Moving avg" represents the accuracy achieved by applying weighted using bidirectional moving averages to the results obtained from RGB images and difference images in the backbone. "RGB+Diff+Moving avg.+C3D" represents the accuracy result in accordance with an embodiment of the present disclosure.

As shown in FIG. 5, the result according to an embodiment of the present disclosure has an improved accuracy compared to other prior art.

FIG. 7 and FIG. 8 illustrate diagrams showing the results of comparison of behavior recognition accuracy between the prior art and an embodiment of the present disclosure. As shown in FIG. 7 and FIG. 8, it can be seen that the behavior recognition classification accuracy is enhanced with the approach presented in this embodiment, in comparison to conventional techniques.

Figure 9:
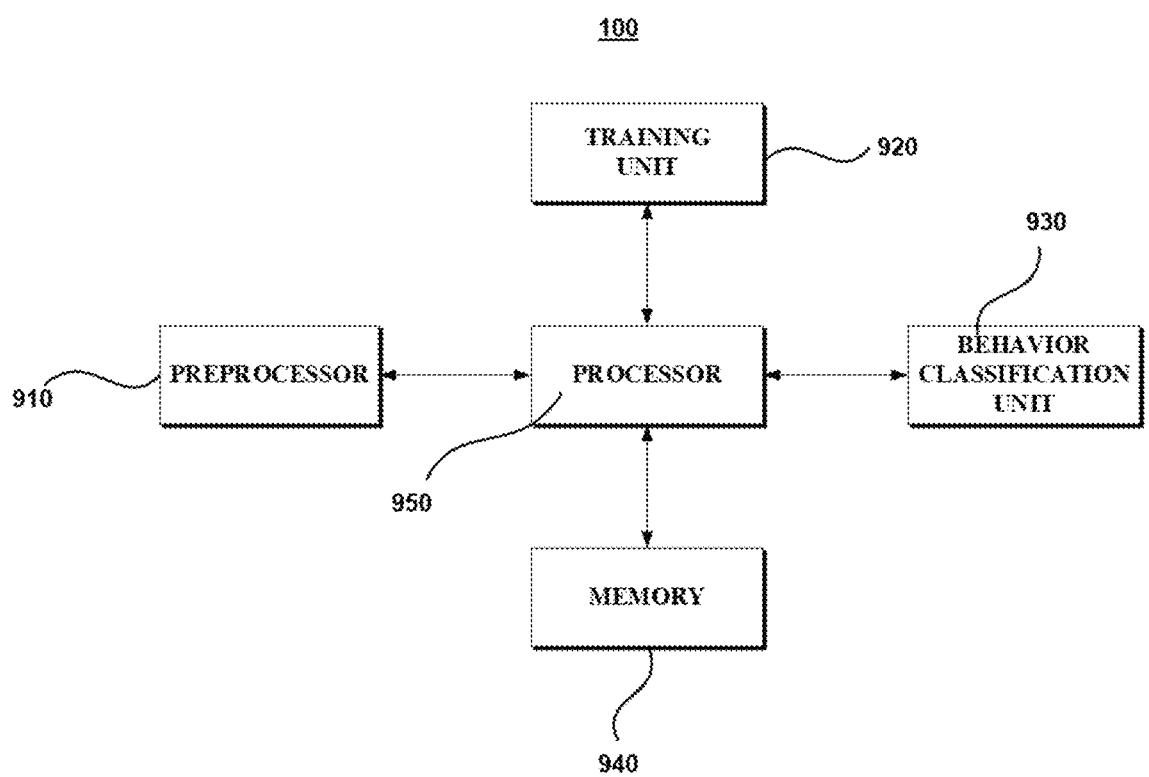
FIG. 9 is a diagram illustrating the configuration of a deep learning-based behavior recognition device according to an embodiment of the present disclosure.

FIG. 9 is a block diagram schematically showing the internal configuration of a deep learning-based behavior recognition device according to an embodiment of the present disclosure.

Referring to FIG. 9, the deep learning-based behavior recognition device 100 according to an embodiment of the present disclosure includes a preprocessor 910, a training unit 920, a behavior classification unit 930, a memory 940, and a processor 950.

The preprocessor 910 generates a video clip after sampling a video, and generates a difference image set of the video clip.

Additionally, the preprocessor 910 may convert the video clip into a format suitable for application to the 3D CNN model of the deep learning-based behavior recognition model 300.

The training unit 920 is a means for learning a deep learning-based behavior recognition model using a training set.

The behavior classification unit 930 is a means for generating a spatio-temporal combined feature map with spatial features and temporal features by applying the sampled frames and the set of differential images to a learned deep learning-based behavior recognition model, adjusting the weight of the spatio-temporal combined feature map by calculating a bi-directional exponential moving average, fusing the weight-adjusted spatio-temporal combined feature map and a temporal relationship importance map containing 3D features of the sampled frames, and then classifying the behavior.

The deep learning-based behavior recognition model includes a feature extraction unit 310, a 3D CNN model unit 315, a plurality of fully connected layers 320, a weight adjustment unit 325, and a fusion classification unit 330.

The feature extraction unit 310 may generate a first feature map with spatial features by applying the sampled frames to a first 2D CNN model, may generate a second feature map with temporal features by applying the difference image set to a second 2D CNN model, and may generate a spatio-temporal combined feature map by combining the first feature map and the second feature map for each sampled frame.

3D CNN model unit 315 may generate a temporal relationship importance map by applying the video clip into the trained deep learning-based behavior recognition model.

The weight adjustment unit 325 may calculate a bi-directional exponential moving average using the spatio-temporal combined feature map and then adjust the weight of the spatio-temporal combined feature map of sampled frames.

The fusion classification unit 330 may perform late fusion by applying the weight-adjusted spatio-temporal combined feature map and the temporal relationship importance map to the learned deep learning-based behavior recognition model and then classify the behavior.

Since the deep learning-based behavior recognition model is the same as described with reference to FIG. 3, detailed description will be omitted.

The memory 940 stores various instructions for performing a deep learning-based behavior recognition method according to an embodiment of the present disclosure.

The processor 950 is a means to control internal components (e.g., a preprocessor 910, a training unit 920, and a behavior classification unit 930, and a memory 940, etc.) of the deep learning-based behavior recognition device 100 according to an embodiment of the present disclosure.

The apparatus and the method according to the embodiment of the present disclosure may be implemented in a form of program commands that may be executed through various computer means and may be recorded in a computer-readable recording medium. The computer-readable recording medium may include a program command, a data file, a data structure, or the like, alone or in a combination thereof. The program commands recorded in the computer-readable recording medium may be especially designed and constituted for the present disclosure, or may be known to and usable by those skilled in the field of computer software. Examples of the computer-readable recording medium may include magnetic media such as a hard disk, a floppy disk, and a magnetic tape; optical media such as a compact disk read only memory (CD-ROM) or a digital versatile disk (DVD); magneto-optical media such as a floptical disk; and a hardware device specially configured to store and execute program commands, such as a read only memory (ROM), a random-access memory (RAM), a flash memory, or the like. Examples of the program commands include a high-level language code capable of being executed by a computer using an interpreter, or the like, as well as a machine language code made by a compiler.

The above-mentioned hardware device may be configured to be operated as one or more software modules in order to perform an operation according to the present disclosure, and vice versa.

Hereinabove, the present disclosure has been described with reference to exemplary embodiments thereof. It will be understood by those skilled in the art to which the present disclosure pertains that the present disclosure may be implemented in a modified form without departing from essential characteristics of the present disclosure. Therefore, the embodiments disclosed herein should be considered in an illustrative aspect rather than a restrictive aspect. The scope of the present disclosure should be defined by the claims rather than the above-mentioned description, and all differences within the scope equivalent to the claims should be interpreted to fall within the present disclosure.

The invention claimed is:

1. A behavior recognition method using deep learning performed in a behavior recognition device, comprising:
   (a) sampling a video to generate a video clip composed of sampled frames and generating a set of differential images between the sampled frames, wherein a set of frames sampled from an initial set $\{I_0^*, \ldots, I_{T-1}^*\}$ of video frames is composed of $\{I_0, \ldots, I_{N-1}\}$, the sampled frames have equal intervals and are generated as $$I_n = \begin{cases} I_{mn}^*, & n = 0, \ldots, N-2 \\ I_{T-1}^*, & n = N-1 \end{cases}$$

such that continuity exists between each frame, and each frame size is adjusted to a size of 112×112, $m = \lfloor T/N \rfloor$ representing an index of the video clip, T represents the total number of frames, N represents the number of sampled frames, $I_{mn}^*$ represents an nth sampled frame in an mth video clip, and $I_{T-1}^*$ represents a last video frame of the initial set of video frames;

(b) applying the sampled frames and the set of differential images to the trained deep learning-based behavior recognition model, respectively, to extract a first feature map with spatial features and a second feature map with temporal features, and combining the first feature map and the second feature map to generate a spatio-temporal combined feature map for each of the sampled frames;

(c) calculating a bi-directional exponential moving average using the spatio-temporal combined feature map for the sampled frames, and adjusting the weights of the spatio-temporal combined feature maps of the sampled frames, respectively, using the bidirectional exponential moving average;

(d) generating the video clip as 3D data having a size of 3×16×112×112, and then applying the video clip to the trained deep learning-based behavior recognition model to generate a temporal correlation importance map through a convolution operation; and (e) applying the weight-adjusted spatio-temporal combined feature map and the temporal correlation importance map to the trained deep learning-based behavior recognition model, late-fusing these maps, and classifying the behavior of the video clip, wherein the bidirectional exponential moving average is calculated by symmetrically dividing the weight of the spatio-temporal combined feature map for an intermediate frame of the sampled frame, and the weight is adjusted by recursively being calculated using the following mathematical formula 1,

[Mathematical Formula 1]

$$S_n = \begin{cases} \alpha S_{n+1} + (1-\alpha)V_n, & n < \frac{N-1}{2} \\ V_n & n = \frac{N-1}{2} \\ \alpha S_{n-1} + (1-\alpha)V_n, & n > \frac{N-1}{2} \end{cases}$$

wherein, $S_n$ represents the bidirectional exponential moving average, $V_n$ represents a feature vector for the spatio-temporal combined feature map for the sampled frame, n represents an index having a temporal order for the sampled frame, $\alpha$ represents a constant value for adjusting a ratio of the bidirectional exponential moving average with a value between 0 and 1, N represents the number of sampled video frames, $S_{n-1}$ represents a bidirectional exponential moving average for a feature vector of Sn previous order and is determined by $S_n$, and $S_{n+1}$ represents a bidirectional exponential moving average for a feature vector of $S_n$ next order and is determined by $S_n$, and a final loss of the recursively calculated bidirectional exponential moving average is calculated using the average of the first and last values of $S_n$ using the following mathematical formula 2,

[Mathematical Formula 2]

$$S = \frac{S_0 + S_{N-1}}{2}$$

wherein, $S_0$ and $S_{N-1}$ are the first and last values of $S_n$ as values at both ends that are weighted based on a central frame (middle frame) among the sampled frames.

2. The behavior recognition method of claim 1, wherein the deep learning-based behavior recognition model comprises a plurality of 2D CNN models and a 3D CNN model, the first feature map and the second feature map are generated by the plurality of 2D CNN models, and the temporal correlation importance map is generated by the 3D CNN model.

3. The behavior recognition method of claim 1, wherein the step (e), a softmax value, which is an activation function of the weight-adjusted spatio-temporal combine feature map, and a softmax value, which is an activation function of the temporal correlation importance map, are fused with the same weight, and the behavior is classified using the fused result value.

4. A non-transitory computer-readable recording medium in which a program code for performing the method according to claim 1 is recorded.

5. A behavior recognition device using deep learning, comprising:

a preprocessor that samples a video to generating a video clip composed of sampled frames, and generates a set of differential images between the sampled frames, wherein a set of frames sampled from an initial set $\{I_0^*, \ldots, I_{T-1}^*\}$ of video frames is composed of $\{I_0, \ldots, I_{N-1}\}$, the sampled frames have equal intervals and are generated as $$I_n = \begin{cases} I_{mn}^*, & n = 0, \ldots, N-2 \\ I_{T-1}^*, & n = N-1 \end{cases}$$

such that continuity exists between each frame, and each frame size is adjusted to a size of 112×112, $m = \lfloor T/N \rfloor$ representing an index of the video clip, T represents the total number of frames, N represents the number of sampled frames, $I_{mn}^*$ represents an nth sampled frame in an mth video clip, and $I_{T-1}^*$ represents a last video frame of the initial set of video frames;

a behavior classification unit that applies the sampled frames and the set of differential images to a deep learning-based behavior recognition model to generate a spatio-temporal combine feature map having temporal and spatial features, calculates a bidirectional exponential moving average to adjust a weight of the spatio-temporal combine feature map, and classifies the behavior of the video clip by late fusing a temporal correlation importance map having three-dimensional features for the sampled frames and a spatio-temporal combine feature map with the adjusted weight, wherein the deep learning-based behavior recognition model includes:

a feature extraction unit that applies the sampled frames to a first 2D CNN model to generate a first feature map including the spatial feature, applies the set of differential images to a second 2D CNN model to extract a second feature map including the temporal feature, and then combines the first feature map and the second feature map to generate a spatio-temporal combine feature map for each of the sampled frames;

a 3D CNN model unit that generates the video clip as 3D data having a size of 3×16×112×112, and then applies the video clip to the trained deep learning-based behavior recognition model to generate a temporal correlation importance map through a convolution operation;

a weight adjustment unit that calculates a bidirectional exponential moving average using the spatio-temporal combine feature map and then adjusts the weight of the spatio-temporal combine feature map of the sampled frames; and a fusion classification unit that applies the weight-adjusted spatio-temporal combined feature map and the temporal correlation importance map to the trained deep learning-based behavior recognition model, late-fuses these maps, and then classifies the behavior of the video clip, wherein the bidirectional exponential moving average is calculated by symmetrically dividing the weight of the spatio-temporal combined feature map for an intermediate frame of the sampled frame, and the weight is adjusted by recursively being calculated using the following mathematical formula 1,

[Mathematical Formula 1]

$$S_n = \begin{cases} \alpha S_{n+1} + (1-\alpha)V_n, & n < \frac{N-1}{2} \\ V_n, & n = \frac{N-1}{2} \\ \alpha S_{n-1} + (1-\alpha)V_n, & n > \frac{N-1}{2} \end{cases}$$

wherein, $S_n$ represents the bidirectional exponential moving average, $V_n$ represents a feature vector for the spatio-temporal combined feature map for the sampled frame, n represents an index having a temporal order for the sampled frame, α represents a constant value for adjusting a ratio of the bidirectional exponential moving average with a value between 0 and 1, N represents the number of sampled video frames, $S_{n-1}$ represents a bidirectional exponential moving average for a feature vector of $S_n$ previous order and is determined by $S_n$, and $S_{n+1}$ represents a bidirectional exponential moving average for a feature vector of $S_n$ next order and is determined by $S_n$, and a final loss of the recursively calculated bidirectional exponential moving average is calculated using the average of the first and last values of $S_n$ using the following mathematical formula 2, Mathematical Formula 21

$$S = \frac{S_0 + S_{N-1}}{2}$$

wherein, $S_0$ and $S_{N-1}$ are the first and last values of $S_n$ as values at both ends that are weighted based on a central frame (middle frame) among the sampled frames.

6. The behavior recognition device of claim 5, wherein the feature extraction unit and the 3D CNN model unit are connected by a plurality of fully connected layers (FC layers), and
 the weight adjustment unit is arranged at a rear end of the plurality of fully connected layers (FC layers), and is connected to to the plurality of fully connected layers (FC layers) so that the weight of the sampled spatio-temporal combine feature map is adjusted.

7. The behavior recognition device claim 5, wherein the fusion classification unit uses a softmax value, which is an activation function of the weight-adjusted spatio-temporal combine feature map, and a softmax value, which is an activation function of the temporal correlation importance map, are fused with the same weight, and classifies the behavior using the fused result value.

8. The behavior recognition device of claim 5, further comprising: a training unit that trains the deep learning-based behavior recognition model using a training data set.

\* \* \* \* \*